Dec. 20, 1949 R. G. LE TOURNEAU 2,491,988
APRON ASSEMBLY FOR EARTHWORKING SCRAPERS
Filed June 2, 1947 2 Sheets-Sheet 2

INVENTOR.
R. G. LeTourneau
BY
ATTYS

Patented Dec. 20, 1949

2,491,988

UNITED STATES PATENT OFFICE 2,491,988

APRON ASSEMBLY FOR EARTHWORKING SCRAPERS

Robert G. Le Tourneau, Longview, Tex., assignor to R. G. Letourneau, Inc., Stockton, Calif., a corporation of California Application June 2, 1947, Serial No. 751,842

7 Claims. (Cl. 37—118)

This invention relates in general to earth working scrapers, of the carry-type, which include a bowl open at the front end, and a vertically adjustable load retaining apron cooperating with said end of the bowl.

In certain scrapers of this type, the bowl includes a pair of transversely spaced, forwardly projecting lift arms vertically adjustably suspended by cables from a draft yoke which straddles and is pivotally connected to the bowl on opposite sides; the apron being disposed between said lift arms and including a pair of side arms which project rearward to pivotal connection with corresponding sides of the bowl.

One object of the present invention is to form the apron at its ends so that it may work close between the bowl lift arms, and with the apron side arms substantially vertically alined with said bowl lift arms; this latter being a desirable feature as it permits both sets of arms to be disposed in a longitudinal plane close to the corresponding sides of the bowl and thus less subject to damage.

Another object of the invention is to accomplish the foregoing by imparting to the ends of the apron a novel offsetting arrangement; which offsetting also strengthens and rigidifies said ends of the apron.

A further object of the invention is to provide a practical and rugged apron assembly for earth working scrapers which will be exceedingly effective for the purpose for which it is designed.

These objects are accomplished by means of such structure and relative arrangement of parts as will fully appear by a perusal of the following specification and claims.

Figure 1:
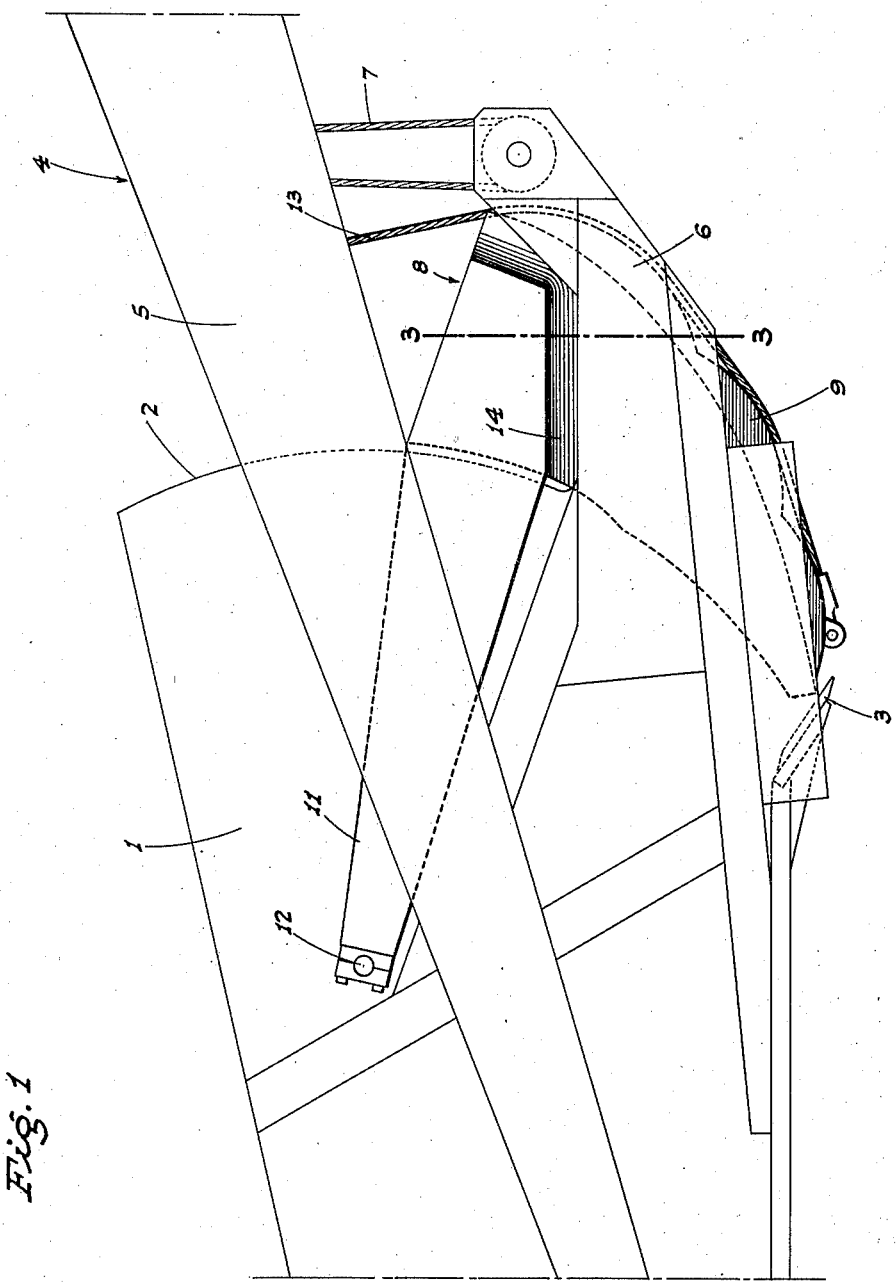
Fig. 1 is a fragmentary side elevation, somewhat diagrammatic, of an earth working scraper embodying the present invention.

Referring now more particularly to the characters of reference on the drawings, the invention is shown as embodied in an earth working scraper, of the carry type, which includes a bowl 1 open at its front end 2, and including a transverse, earth cutting and digging blade 3 fixed on the front edge of the bottom of said bowl.

The bowl 1, which is supported at its rear end by wheels (not shown) is straddled from the front end by a draft yoke, indicated generally at 4, which draft yoke includes transversely spaced, rearwardly and downwardly inclined side beams 5 which couple, at their rear ends, by pivots (not shown) to corresponding sides of said bowl. The draft yoke 4 is arranged to connect to a hauling tractor.

In the type of scraper in which this invention is included, the bowl 1 is formed, at the front and on opposite sides, with forwardly projecting lift arms 6, which extend from the bowl adjacent the bottom portions of the sides thereof. The bowl 1, including the cutting and digging blades 3, is vertically adjustable by means of a power-actuated cable system, indicated in part at 7, which connects between the draft yoke 4 and the forward ends of the lift arms 6.

Between the lift arms 6 and the bowl 1, there is a vertically adjustable, earth retaining apron 8, which apron includes opposite end plates, indicated generally at 9, and a double bottom 10 which extends at a forward and upward curve; the concave portion of the apron facing rearwardly.

Side arms 11 are rigidly fixed to opposite ends of the apron adjacent the top thereof and extend along opposite sides of the bowl to pivotal connections with the bowl, as at 12.

The apron is thus mounted for vertical adjustment through the medium of a power-actuated lift cable system, shown in part at 13.

Figure 3:
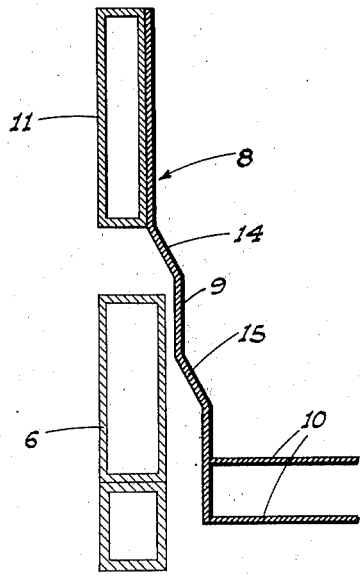
Fig. 3 is a fragmentary cross section on line 3—3 of Fig. 1.
Figure 4:
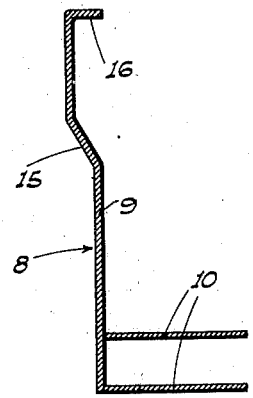
Fig. 4 is a fragmentary cross section on line 4—4 of Fig. 2.

As clearly shown in Fig. 3, the forwardly projecting lift arms 6 of the bowl 1, and the rearwardly projecting side arms 11 of the apron 8 are disposed in substantially vertical alinement; this being possible by reason of the following configuration of the end plates 9 of said apron 8.

Figure 2:
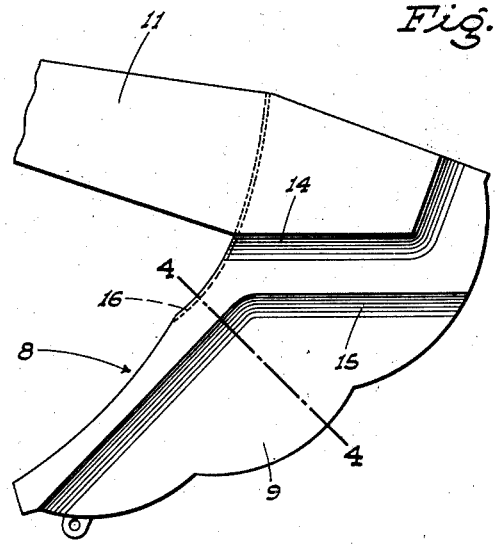
Fig. 2 is a fragmentary end elevation of the apron, detached.

Each end plate 9 directly below the corresponding side arm 11 is formed with a laterally inward offset 14, which offset extends forwardly from the rear edge of said plate 9 to adjacent but short of the front edge, and thence turns and extends upward to the top edge of such plate, all as clearly shown in Fig. 2.

By reason of this laterally inward offset 14 the corresponding lift arm 6 of the bowl may be disposed directly below the adjacent side arm 11 of the apron, as clearly shown in Fig. 3. The advantage of this arrangement is compactness, together with the avoidance of undue lateral projection of the arms so as to prevent damage resulting from striking objects which the scraper passes in close relation.

In spaced relation below the offset 14, but above the bottom 10 of the apron, each end plate 9 is formed with another offset 15 which extends rearwardly from the front edge of such plate to adjacent but short of its rear edge and thence turns and extends downward to the bottom edge generally parallel to said rear edge.

With the described offsetting arrangement, each offset includes one portion extending lengthwise of the direction of travel of the implement, and another portion extending generally lengthwise of the path of vertical adjustment of the apron; such offsetting strengthening and rigidifying the ends of the apron against undesirable vibration or deflection under working conditions.

Further rigidity is imparted to the apron by an inturned flange 16 on the rear edge of each end plate 9 throughout generally the upper half thereof.

The function of the apron 8 in relation to the bowl 9 is the same as in other scrapers of this type, and thus requires no description in the present specification.

From the foregoing description it will be readily seen that there has been produced such a device as substantially fulfills the objects of the invention as set forth herein.

While this specification sets forth in detail the present and preferred construction of the device, still in practice deviations from such detail may be resorted to as do not form a departure from the spirit of the invention, as defined by the appended claims.

Having thus described the invention, the following is claimed as new and useful, and upon which Letters Patent are desired:

1. An apron assembly for an earth working scraper which includes a vertically adjustable bowl having lift arms projecting forwardly from opposite sides of the bowl, a vertically adjustable apron extending between the bowl lift arms in cooperative relation to the front of the bowl, and side arms separate from the lift arms fixed to and projecting rearwardly from opposite ends of the apron along and pivoted to opposite sides of the bowl; corresponding bowl lift arms and apron side arms being generally vertically alined, and the ends of the apron being laterally inwardly offset below said side arms to permit the apron to work vertically between the bowl lift arms without obstruction by the latter.

2. An apron assembly for an earth working scraper which includes a vertically adjustable bowl having lift arms projecting forwardly from opposite sides of the bowl, a vertically adjustable apron extending between the bowl lift arms in cooperative relation to the front of the bowl, and side arms projecting rearwardly from opposite ends of the apron along and pivoted to opposite sides of the bowl; corresponding bowl lift arms and apron side arms being generally vertically alined, the apron including end plates secured at the upper part to corresponding side arms, and said plates having laterally inwardly offset portions below said side arms to permit the apron to work vertically between the bowl lift arms without obstruction by the latter, said offset portions including a laterally inward offset in each plate extending forwardly from its rear edge to adjacent but short of the front edge.

3. An apron assembly for an earth working scraper which includes a vertically adjustable bowl having lift arms projecting forwardly from opposite sides of the bowl, a vertically adjustable apron extending between the bowl lift arms in cooperative relation to the front of the bowl, and side arms projecting rearwardly from opposite ends of the apron along and pivoted to opposite sides of the bowl; corresponding bowl lift arms and apron side arms being generally vertically alined, the apron including end plates secured at the upper part to corresponding side arms, and said plates having laterally inwardly offset portions below said side arms to permit the apron to work vertically between the bowl lift arms without obstruction by the latter, said offset portions including a laterally inward offset in each plate extending forwardly from its rear edge to adjacent but short of the front edge and thence extending upwardly some distance.

4. An apron assembly, as in claim 3, including another laterally inward offset in each plate, below said first named offset, extending rearwardly from the front edge of the corresponding plate to adjacent but short of its rear edge.

5. An apron assembly, as in claim 3, including another laterally inward offset in each plate, below said first named offset, extending rearwardly from the front edge of the corresponding plate to adjacent but short of its rear edge and thence extending downward some distance.

6. In an apron for an earth working scraper, end plates on the apron, and side arms secured to upper portions of said plates and projecting rearwardly therefrom; said plates being laterally inwardly offset below corresponding side arms by vertically spaced offsets, said offsets including vertically spaced portions extending lengthwise relative to the side arms, and opposite end portions extending upwardly and downwardly, respectively.

7. An assembly as in claim 1, in which the apron ends at the top abut and are secured directly against the side arms to obtain maximum earth retaining capacity and said laterally inward offset of the apron ends includes vertically and transversely spaced downwardly and inwardly sloping portions extending lengthwise of said side arms whereby to stiffen the apron.

ROBERT G. LE TOURNEAU.

REFERENCES CITED

The following references are of record in the file of this patent:

UNITED STATES PATENTS

| Number | Name | Date |
|---|---|---|
| 2,159,438 | Le Bleu | May 23, 1939 |
| 2,321,410 | Mork et al. | June 8, 1943 |